(12) United States Patent
Sabe et al.

(10) Patent No.: US 6,912,449 B2
(45) Date of Patent: Jun. 28, 2005

(54) IMAGE PROCESSING APPARATUS, ROBOT APPARATUS AND IMAGE PROCESSING METHOD

(75) Inventors: Kohtaro Sabe, Tokyo (JP); Takayuki Sakamoto, Kanagawa (JP)

(73) Assignee: Sony Corporation, Tokyo (JP)

( * ) Notice: Subject to any disclaimer, the term of this patent is extended or adjusted under 35 U.S.C. 154(b) by 727 days.

(21) Appl. No.: 10/023,625

(22) Filed: Dec. 18, 2001

(65) Prior Publication Data

US 2002/0054240 A1 May 9, 2002

Related U.S. Application Data

(63) Continuation of application No. 09/743,290, filed as application No. PCT/JP00/02986 on May 10, 2000, now abandoned.

(30) Foreign Application Priority Data

May 10, 1999 (JP) .......................................... 11-129274

(51) Int. Cl.[7] ........................ G05B 15/00; G05B 19/00
(52) U.S. Cl. ...................... 700/259; 700/245; 700/250; 700/253; 700/257; 382/181; 382/154; 382/278; 382/303
(58) Field of Search ................................ 700/245–246, 700/250, 253, 257, 259; 382/181, 154, 278, 303, 304; 707/104.1; 348/47; 701/45; 280/735

(56) References Cited

U.S. PATENT DOCUMENTS

| | | | |
|---|---|---|---|
| 4,805,226 A | | 2/1989 | Guebey |
| 4,850,027 A | * | 7/1989 | Kimmel ...................... 382/303 |
| 5,809,322 A | * | 9/1998 | Akerib .......................... 712/14 |
| 6,456,737 B1 | * | 9/2002 | Woodfill et al. ............ 382/154 |
| 6,603,865 B1 | * | 8/2003 | Yagi et al. .................. 382/103 |
| 2001/0018640 A1 | | 8/2001 | Matsunuga |
| 2001/0020837 A1 | | 9/2001 | Yamashita et al. |
| 2001/0021882 A1 | | 9/2001 | Hosonuma et al. |

FOREIGN PATENT DOCUMENTS

| | | |
|---|---|---|
| JP | 6-229941 | 8/1994 |
| JP | 8-272675 | 10/1996 |
| JP | 8-297585 | 11/1996 |
| WO | WO 93 19431 | 9/1993 |

OTHER PUBLICATIONS

Bolle et al., Fast parallel image processing for robot vision for the purpose of extracting information about objects, 1983, IEEE, pp. 126–127.*

Ishikawa et al., A CMOS Vision Chip with SIMD Processing Element Array for 1mns Image Processing, 1999, IEEE, pp. 206–207.

Astley et al., Design Constraints for Haptic Surgery Simulation, 2000, IEEE, pp. 2446–2451.

Rosen et al., Markov Modeling of Minimally Invasive Surgery Based on Tool/Tissue Interaction and Force/Torque Signatures for Evaluating Surgical Skill, 2001, IEEE, pp. 579–591.

(Continued)

Primary Examiner—Thomas G. Black
Assistant Examiner—McDieunel Marc
(74) Attorney, Agent, or Firm—Frommer Lawrence & Haug LLP; William S. Frommer

(57) ABSTRACT

Each of plural image processing means is informed of address information of storage means in which image data to be read is stored upon request of the image data to be read by each of the plural image processing means. Consequently, each of the image processing means can read each of image data to be read directly from the storage means based on the informed address information so as to subject it to predetermined image processing. Thus, it is possible to perform plural independent image processing in parallel at a high speed with the simple configuration.

7 Claims, 9 Drawing Sheets

OTHER PUBLICATIONS

Morton S G: "A236 parallel DSP chip provides real–time video processing economically and efficiently" Electro '96. Professional Program Proceedings. Somerset, NJ, USA Apr. 30–May 2, 1996, New York, NY, USA, IEEE, US Apr. 30, 1996, pp. 261–268, XP010162323 ISBN: 0–7803–3271–7.

Drayer T H et al: "A high performance Micro Channel interface for real–time industrial image processing applications" Industrial Electronics, Control and Instrumentation, 1994. IECON '94., 20th International Conference on Bologna, Italy Sep. 5–9, 1994, New York, NY, USA,IEEE, Sep. 5, 1994 pp. 884–889, XP010137579 ISBN: 0–7803–1328–3.

* cited by examiner

70

| Bit | 31 30 29 28 27 26 25 24 23 22 21 20 19 18 17 16 15 14 13 12 11 10 9 8 7 6 5 4 3 2 1 0 | |
|---|---|---|
| R/W | Current Source Start Address | 85 |
| R/W | Current Destination Start Address | 86 |
| R/W | Done Count / Busy / Current Status | 87 / 88 |
| R | Default Source Start Address | 73 |
| R | Default Destination Start Address | 74 |
| R | Interen / BusOut / Iomem / Bytee / Loopen / Default Transfer Size | 75 / 76 / 77 / 78 |
| R | Source Address Skip | 81 |
| R | Destination Address Skip | 82 |
| R | Source/Destination End Address | 83 |
| R | Next DMAList Pointer | 84 |

(89, 80, 79 markers on left)

FIG. 5

IMAGE PROCESSING APPARATUS, ROBOT APPARATUS AND IMAGE PROCESSING METHOD

This application is a continuation of application Ser. No. 09/743,290, filed Feb. 26, 2001, now abandoned which is a 371 of PCT/JP60/02986 filed on May 10, 2000.

TECHNICAL FIELD

The present invention relates to an image processing apparatus, a robot apparatus and an image processing method. For example, the present invention is suitably applied to a pet robot which acts like a quadruped animal.

BACKGROUND ART

There has been conventionally developed an image processing system in which an image input device such as a video camera is connected to a general-purpose calculator such as a personal computer or a work station so that image data input from the image input device is processed in the calculator. The calculator in such an image processing system is provided with plural image processing objects for performing image processing such as color detection or motion detection, thereby subjecting the input image data to plural image processing.

Consequently, in the calculator in the image processing system, the image data input from the image input device is temporarily stored in a frame buffer, and then, the image data is transferred from the frame buffer to a memory, to which a CPU (Central Processing Unit) for executing each of the image processing objects can directly make access, or the image data is read by direct access of each of the image processing objects to the frame buffer.

Alternatively, besides the image processing system in which the image input device is connected to the general-purpose calculator, there has been developed an incorporation type image processing apparatus in which an image input device is previously incorporated in a general-purpose calculator. Such an incorporation type image processing apparatus includes a DSP (Digital Signal Processor) for executing specific image processing, is configured such that single image processing can be performed at a high speed by directly writing image data in a memory in the DSP.

In the image processing system in which the image input device is connected to the general-purpose calculator, a time taken for transferring the image data is liable to be increased in proportion to the number of image processing objects which are executed by the CPU, with an attendant problem of a long time required for the image processing. Incidentally, a method for temporarily storing the image data in the frame buffer to then transfer it to the memory is disclosed in, for example, Japanese Patent Laid-open No. 8-297585. However, this method raises problems that a transferring speed becomes low by a time required for temporarily storing the image data in the frame buffer, and further, that the CPU cannot perform other processing till the completion of the data transfer since the CPU transfers the data. Moreover, a method for reading the image data by direct access by each of the image processing objects to the frame buffer raises problems that portability is poor since the CPU directly makes access to the frame buffer as hardware and that safety of data protection cannot be secured, in addition to slow access to the data.

On the other hand, the incorporation type image processing apparatus uses the DSP which can perform only specific image processing, thereby making it difficult to simultaneously perform plural image processing or write a program independent of hardware.

DISCLOSURE OF THE INVENTION

In view of the above-described problems, the present invention has proposed an image processing apparatus, a robot apparatus and an image processing method, in which plural image processing independent of each other can be executed in parallel at a high speed.

In order to solve the above-described problems, according to the present invention, an image processing method comprises the steps of: producing address information for use in storing, in storage means, plural image data sequentially input from image input means, so as to sequentially transfer and store the image data to and in the storage means based on the produced address information; and informing each of plural image processing means of the address information of the storage means in which image data to be read is stored upon request of the image data to be read by each of the plural image processing means. Thus, each of the image processing means can read each of image data to be read directly from the storage means based on the informed address information so as to subject it to predetermined image processing. In this way, it is possible to perform plural independent image processing in parallel at a high speed with the simple configuration.

BRIEF DESCRIPTION OF DRAWINGS

FIG. 5 is a chart schematically illustrating the data structure of a DMA list.

BEST MODE FOR CARRYING OUT THE INVENTION

A preferred embodiment according to the present invention will be described below in reference to the drawings.

(1) Configuration of Pet Robot

Figure 1:
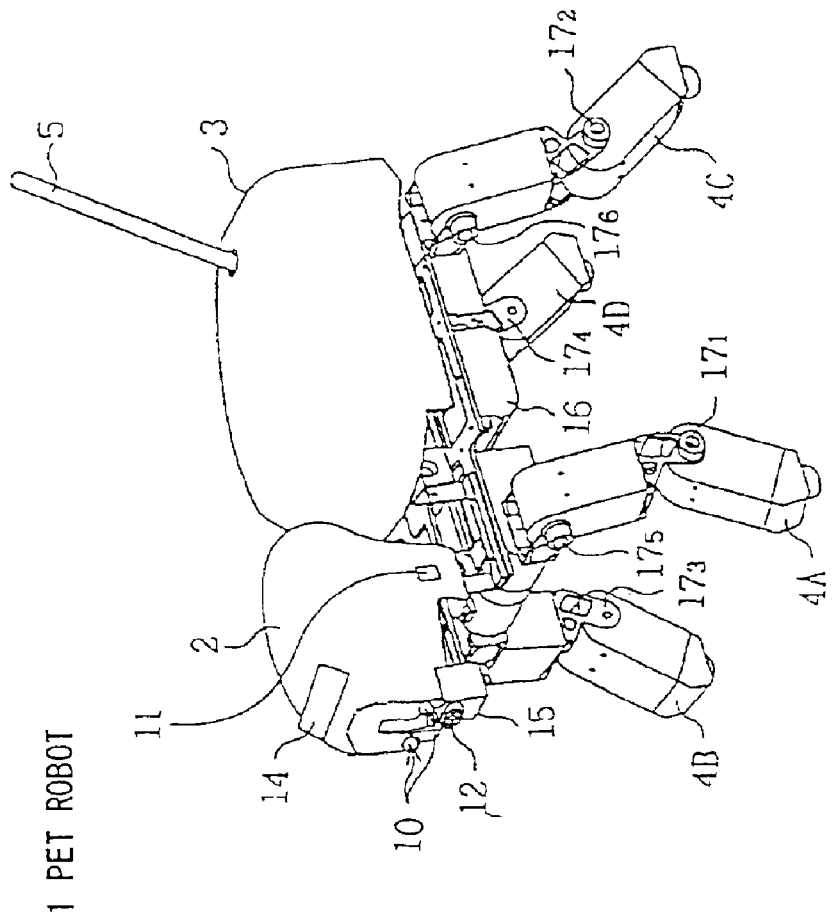
FIG. 1 is a schematic view showing a pet robot in a preferred embodiment according to the present invention.

In FIG. 1, reference numeral 1 denotes a pet robot having the entire appearance like an animal and is configured by connecting a head portion 2 corresponding to a head, a main body portion 3 corresponding to a body, leg portions 4A to 4D corresponding to legs and a tail portion 5 corresponding to a tail to each other. The pet robot is made to act like an actual quadruped animal by actuating the head portion 2, the leg portions 4A to 4D and the tail portion 5 with respect to the main body portion 3.

The head portion 2 is provided at predetermined positions thereof with CCD (Charge Coupled Device) cameras 10 which correspond to eyes and constitute image input means, microphones 11 which correspond to ears and collect a voice, and a speaker 12 which corresponds to a mouth and produces a voice. Furthermore, the head portion 2 is provided with a touch sensor 14 for detecting a contact by a hand of a user or the like, and a distance sensor 15 for detecting a distance to an obstacle which may be present forward in the direction of movement of the pet robot 1.

The main body portion 3 is provided with a battery 16 at a position corresponding to a belly. Moreover, an electronic circuit (not shown) for controlling the entire action of the pet robot 1 is housed inside the battery 16.

Articulations of the leg portions 4A to 4D, articulations connecting the leg portions 4A to 4D to the main body portion 3, articulations connecting the main body portion 3 to the head portion 2, articulations connecting the main body portion 3 to the tail portion 5 and so on are connected via respective actuators $17_1$ to $17_N$, to be thus driven under the control of the electronic circuit housed inside the main body portion 3. The actuators $17_1$ to $17_N$ are driven such that the head portion 2 is wagged vertically and laterally, the tail portion 5 is wagged, or the leg portions 4A to 4D are moved to walk or run. Therefore, the pet robot 1 can act like an actual quadruped animal.

(2) Circuit Configuration of Pet Robot

Figure 2:
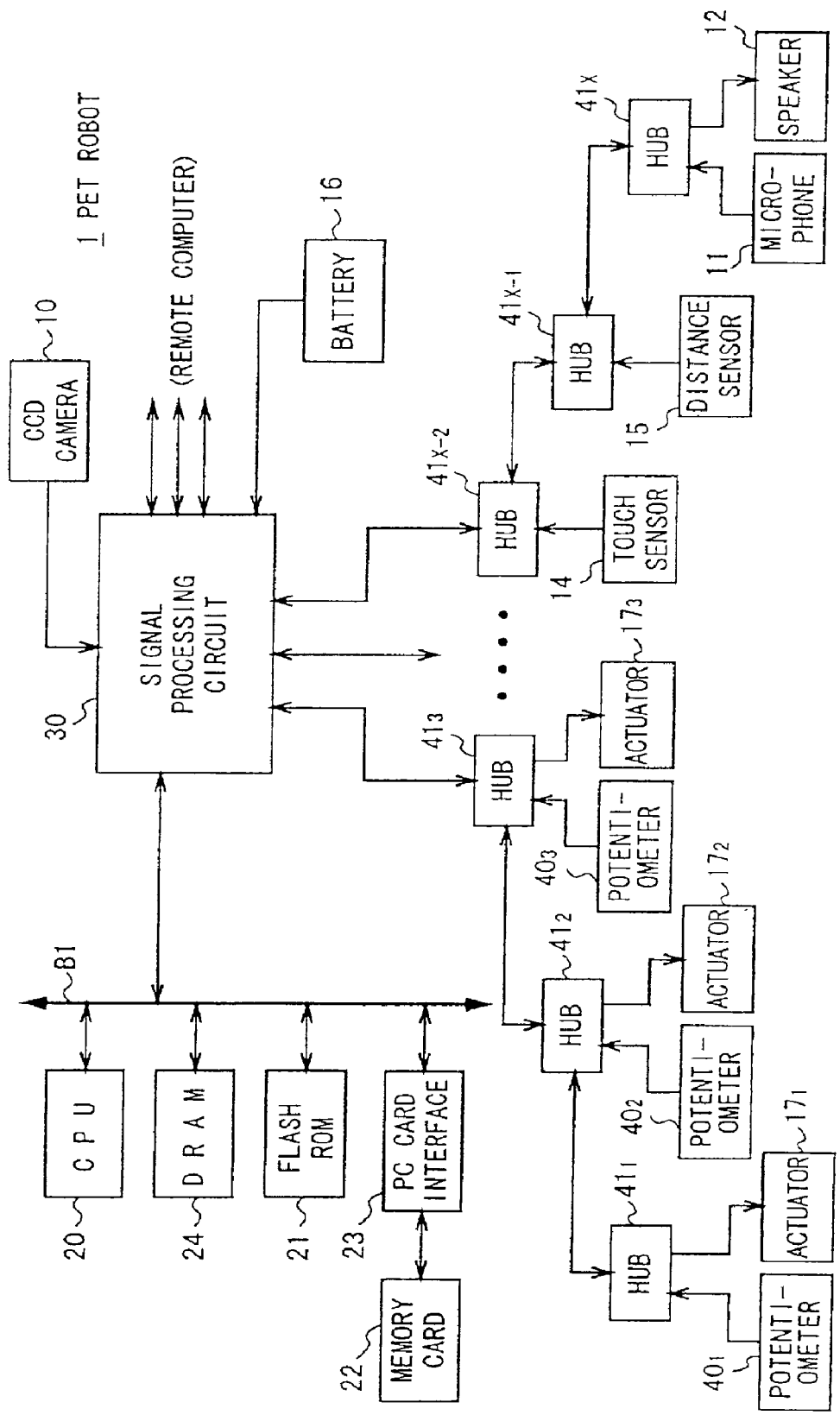
FIG. 2 is a block diagram illustrating the circuit configuration of the pet robot.

FIG. 2 is a diagram illustrating the circuit configuration of the pet robot 1. A CPU (Central Processing Unit) 20 is adapted to control the entire operation of the pet robot 1. The CPU 20 reads a control program stored in a flash ROM (Read Only Memory) 21 via a bus B1 as required, and reads a control program stored in a memory card 22, which is inserted into a PC (Personal Computer) card slot (not illustrated), via a PC card interface 23 and the bus B1 in sequence, and then, transfers and stores the read control programs to and in a DRAM (a Dynamic Random Access Memory) 24 as storage means. The CPU 20 reads and executes the control programs transferred to the DRAM 24 so as to control various circuits of the pet robot 1.

Figure 3:
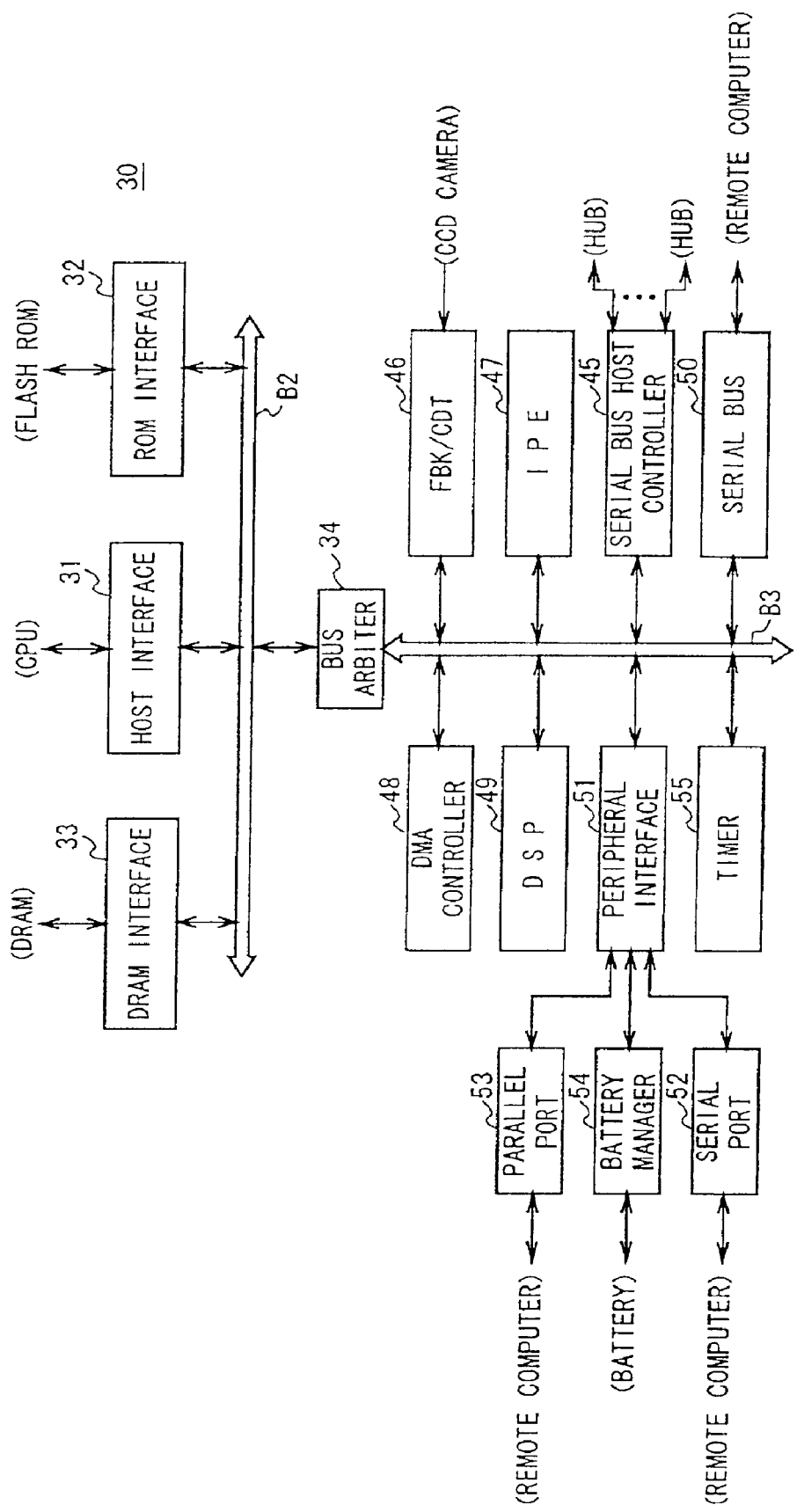
FIG. 3 is a block diagram illustrating the configuration of a signal processing circuit.

A signal processing circuit 30 is adapted to perform various signal processing under the control of the CPU 20. As illustrated in FIG. 3, the signal processing circuit 30 includes a host interface 31 to be connected to the CPU 20 (FIG. 2), a ROM interface 32 to be connected to the flash ROM 21 (FIG. 2), and a DRAM interface 33 to be connected to the DRAM 24 (FIG. 2). The signal processing circuit 30 is connected to the CPU 20, the flash ROM 21 and the DRAM 24 via the bus B1.

The signal processing circuit 30 includes a bus arbiter 34 for performing arbitration (an arbitrating operation of a bus-use right). The bus arbiter 34 is connected to the host interface 31, the ROM interface 32 and the DRAM interface 33 via another bus B2.

Back to FIG. 2, the pet robot 1 includes potentiometers $40_1$ to $40_N$ which respectively detect a driving quantity in the actuators $17_1$ to $17_N$ for driving the articulations. The actuators $17_1$ to $17_N$, the potentiometers $40_1$ to $40_N$ the touch sensor 14, the distance sensor 15, the microphones 11 and the speaker 12 are connected in a tree topology to a serial bus host controller 45 (FIG. 3) in the signal processing circuit 30 via hubs $41_1$ to $41_X$. As illustrated in FIG. 3, the serial bus host controller 45 is connected to the bus arbiter 34 via a further bus B3, so that information on an angle detected by each of the potentiometers $40_1$ to $40_N$, information on a contact detected by the touch sensor 14 and information on a distance to an obstacle detected by the distance sensor 15 are transferred to and stored in the DRAM 24 (FIG. 2) via the bus B3, the bus arbiter 34, the bus B2, the DRAM interface 33 and the bus B1 (FIG. 2) in sequence.

An FBK/CDT (Filter Bank/Color Detection) 46 is to be connected to the CCD camera 10 (FIG. 2). The FBK/CDT 46 takes image data at plural resolutions while performing color recognition of the image data picked up by the CCD camera 10. The taken image data is transferred to and stored in the DRAM 24 (FIG. 2) via the bus arbiter 34 and the DRAM interface 33 in sequence.

An IPE (Inner Product Engine) 47 comprises a two-dimensional digital filter. The IPE 47 produces an edge image, in which the boundary between a floor and a wall or the boundary between walls is emphasized, when image data is supplied from the DRAM 24 (FIG. 2) via the DRAM interface 33 and the bus arbiter 34 in sequence, and then, returns and stores the produced edge image to and in the DRAM 24 (FIG. 2) via the bus arbiter 34 and the DRAM interface 33 in sequence.

A DMA (Direct Memory Access) controller 48 functions as a bus master in charge of data transfer. For example, the DMA controller 48 reads image data from a buffer (not illustrated) of the FBK/CDT 46, and then, transfers it to the DRAM 24 (FIG. 2), or reads image data from the DRAM 24 (FIG. 2) and transfers it to the IPE 47 so as to transfer an edge image as a result calculated by the IPE 47 to the DRAM 24 (FIG. 2).

A DSP (Digital Signal Processor) 49 subjects a voice signal to predetermined data processing when the voice signal indicating, e.g., a command of a user is input from the microphones 11 (FIG. 2) via the hubs $41_X$ to $41_{X-2}$, the serial bus host controller 45 and the bus B3 in sequence, and then, transfers and stores voice information resulting from the predetermined processing to and in the DRAM 24 (FIG. 2) via the bus arbiter 34 and the DRAM interface 33 in sequence.

A serial bus 50 is an interface to be connected to a remote computer (not illustrated) such as a personal computer (PC), and further, is connected to the bus arbiter 34 via the bus B3. A peripheral interface 51 to be connected to the bus arbiter 34 via the bus B3 in a similar manner is connected to a serial port 52 and a parallel port 53 for the purpose of connection to remote computers, and further, is connected to a battery manager 51 for the purpose of connection to the battery 16 (FIG. 2). The battery manager 51 transfers and stores information on a battery remaining quantity informed by the battery 16 to and in the DRAM 24 via the peripheral interface 51, the bus arbiter 34 and the DRAM interface 33 in sequence. A timer 55 functions as a clock housed inside the pet robot 1, and is connected to the bus arbiter 34 via the bus B3.

The CPU 20 autonomously determines a next operation based on various kinds of information developed in the DRAM 24, and then, produces a drive signal in accordance with the determined operation. The CPU 20 sends the drive signal to each of the actuators $17_1$ to $17_N$ via the host interface 31, the bus arbiter 34, the serial bus host controller 45 and the hubs $41_1$ to $41_N$ in sequence housed inside the signal processing circuit 30, so as to drive each of the actuators $17_1$ to $17_N$ thereby allowing the pet robot 1 to act autonomously.

The CPU 20 produces voice information based on various kinds of information developed in the DRAM 24, and sends the voice information to the DSP 49 via the host interface and the bus arbiter 34 in sequence. Thereafter, the DSP 49 converts the voice information into a voice signal, and then, outputs the voice signal through the speaker 12 via the serial bus host controller 45 and the hub $41_X$ in sequence.

(3) Transfer of Image Data

Here, explanation will be made on a transfer method for transferring the image data input from the CCD camera 10 to the DRAM 24. As illustrated in FIGS. 2 and 3, the image data picked up by the CCD camera 10 is input into the FBK/CDT 46 in the signal processing circuit 30, is subjected to predetermined image processing in the FBK/CDT 46, and thereafter, is transferred to the DRAM 24 via the bus arbiter 34 and the DRAM interface 33 in sequence under the control of the DMA controller 48.

Then, the DMA controller 48 reads a DMA list created by the CPU 20 from the DRAM 24 via the bus arbiter 34 and the DRAM interface 33 in sequence, and then, transfers the image data based on information on the transfer source or transfer destination of the image data written in the DMA list. Consequently, when the CPU 20 rewrites the DMA list, the DMA controller 48 can transfer the image data output from the FBK/CDT 46 to an arbitrary position on the DRAM 24. In this way, in the pet robot 1, the image data is transferred to and developed in the DRAM 24, so that fast data processing can be achieved by the effective use of a cache function of the CPU 20.

Figure 4:
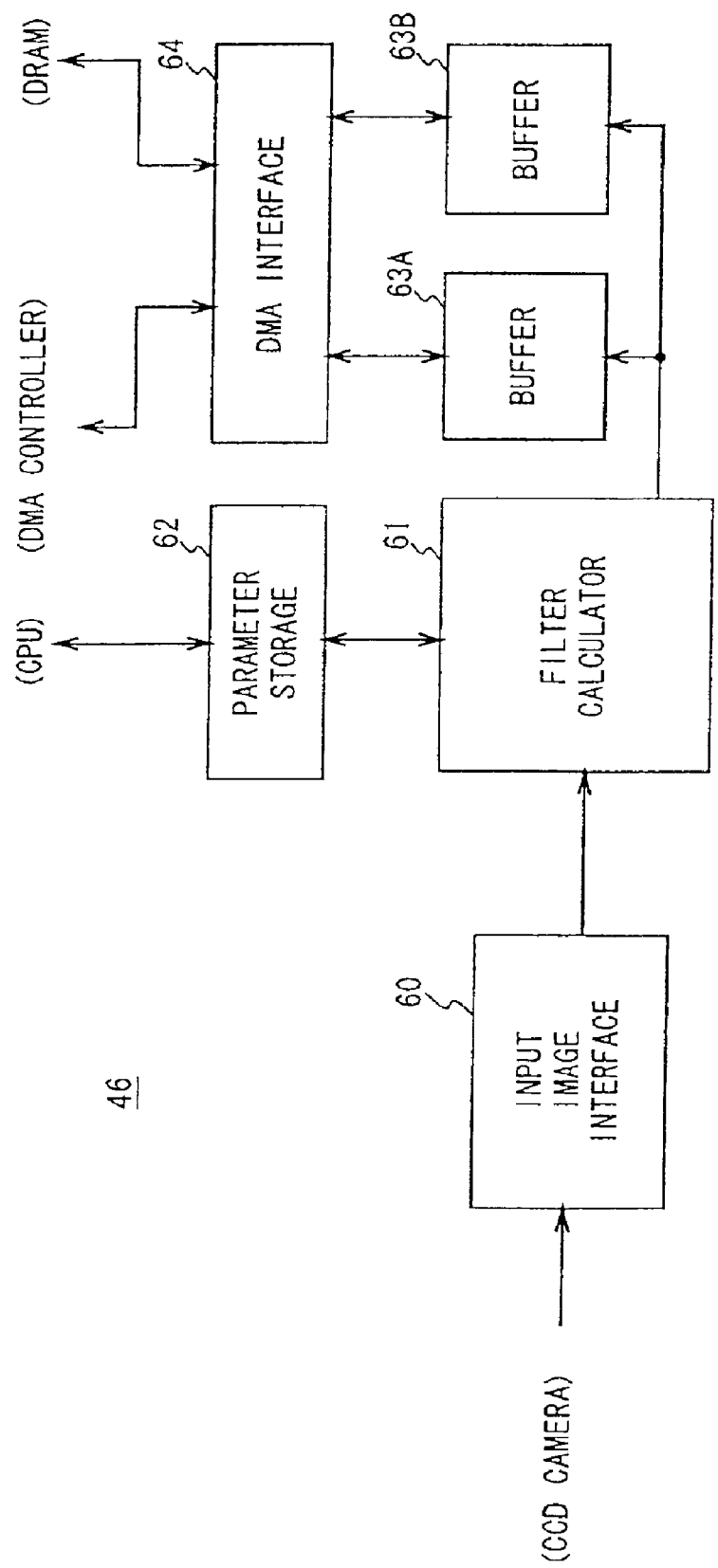
FIG. 4 is a block diagram illustrating the configuration of an FBK/CDT.

Hereinafter, the image data transferring method will be specifically described in reference to FIG. 4 which is a block diagram illustrating the configuration of the FBK/CDT 46. The image data picked up by the CCD camera 10 is composed of parallel data of 8 bits, a clock signal and a synchronous signal. The image data is input into an input image interface 60 of the FBK/CDT 46, in which the image data is converted into a predetermined format, and then, is supplied to a filter calculator 61.

The CPU 20 is adapted to determine various kinds of filter coefficients based on the control programs stored in the DRAM 24 so as to send and store the determined filter coefficients to and in a parameter storage 62. The filter calculator 61 subjects the input image interface 61 to filter calculation by using the filter coefficients stored in the parameter storage 62, thereby producing image data at plural resolutions while performing the color recognition of the supplied image data.

Buffers 63A and 63B each having a storage capacity enough to store image data of one line are provided at a rear stage of the filter calculator 61. Consequently, the filter calculator 61 sends and stores the produced image data per line to and in the buffers 63A and 63B alternately. At this time, a DMA interface 64 reads the image data of one line from one of the buffers 63A and 63B while storing the image data of one line in the other of the buffers 63A and 63B, and then, transfers the read image data of one line to the DRAM 24 based on an instruction from the DMA controller 48 so as to transfer plural image data to the DRAM 24 in sequence. Since the buffers 63A and 63B have only a storage capacity of two lines in total, it is possible to achieve the FBK/CDT 46 of a simple configuration with a small storage capacity.

The above-described image data transfer is performed by the DMA controller 48 functioning as a bus master. That is, the DMA interface 64 sends a transfer requesting signal, which is called a DMA request, to the DMA controller 48 (FIG. 3) when the image data of one line is stored in either one of the buffers 63A and 63B.

Upon receipt of the DMA request, the DMA controller 48 (FIG. 3) first acquires the use right of the buses B1 to B3, and subsequently, reads the DMA list from the DRAM 24 (FIG. 2) based on an address of the DMA list which is informed by the CPU 20.

The DMA controller 48 (FIG. 3) sequentially produces addresses on the DRAM 24 (FIG. 2) as a transfer destination of the image data based on the DMA list, and then, issues a writing signal to each of the buses B1 to B3. The FBK/CDT 46 reads the image data stored in the buffers 63A and 63B so as to send them to the bus B3 in sequence in synchronism with the writing signals to the buses B1 to B3.

The image data output from the FBK/CDT 46 is written in the DRAM 24 at the same time when it is output from the FBK/CDT 46, so that the image data can be transferred at a remarkably high speed. Since the transfer destination of the image data is set in accordance with the DMA list, the DMA controller 48 can transfer the image data at an arbitrary position on the DRAM 24.

The FBK/CDT 46 withdraws the DMA request for the DMA controller 48 so as to cancel the transfer of the image data if every image data stored in the buffers 63A and 63B is gone. In view of this, the DMA controller 48 writes, in the DMA list, information on the data quantity of the image data transferred till the timing when the DMA request is withdrawn, so as to release the buses B1 to B3. When a DMA request is supplied again, the DMA controller 48 reads the above-described DMA list from the DRAM 24 so as to perform subsequent transfer.

Here, FIG. 5 illustrates the data structure of a DMA list 70. This DMA list 70 is composed of data of 10 words, each of which is composed of data of 32 bits. A default source start address 73 is a start address of a transfer source; and a default destination start address 74 is a start address of a transfer destination.

A default transfer size 75 signifies a transfer quantity of image data to be transferred once. A loop enable (Loopen) 76 is a flag for repeatedly using the DMA list; a byte (Byte) 77, a flag for determining a transfer unit; and an I/O memo (Iomem) 78, a flag indicating that image data is transferred from a transfer source, to which an address is not assigned, to a transfer destination, to which an address is assigned. A bus out (Busout) 79 is a flag indicating whether the image data is transferred from or to the DRAM 24; and an interruption enable (Inten) 80, a flag for generating interruption upon completion of the transfer.

A source address skip 81 shows a quantity of addresses, which are skipped at the transfer source after the image data written in the default transfer size 75 has been transferred by the transfer quantity, wherein only a part of a region of an image is extracted and transferred in accordance with the set quantity of the addresses. A destination address skip 82 shows a quantity of addresses, which are skipped at the transfer destination, wherein another image can be embedded in a part of a region in the image in accordance with the set quantity of the addresses.

A source/destination end address 83 is an end address of the transfer destination or the transfer source. A next DMA list pointer 84 is a pointer for writing an address of a DMA list to be read next.

A current source start address 85 is a start address of the transfer source, which is written when the transfer is interrupted on the way. A current destination start address 86 is a start address of the transfer destination, which is written when the transfer is interrupted on the way.

A current status 87 is a region in which there is written a transfer quantity at the time when the transfer is interrupted during the transfer in the transfer quantity written in the default transfer size 75. A busy 88 is a flag which is erected when the transfer is interrupted on the way. A done count 89 is adapted to count up upon every completion of the transfer.

(4) Configuration of Software

Figure 6:
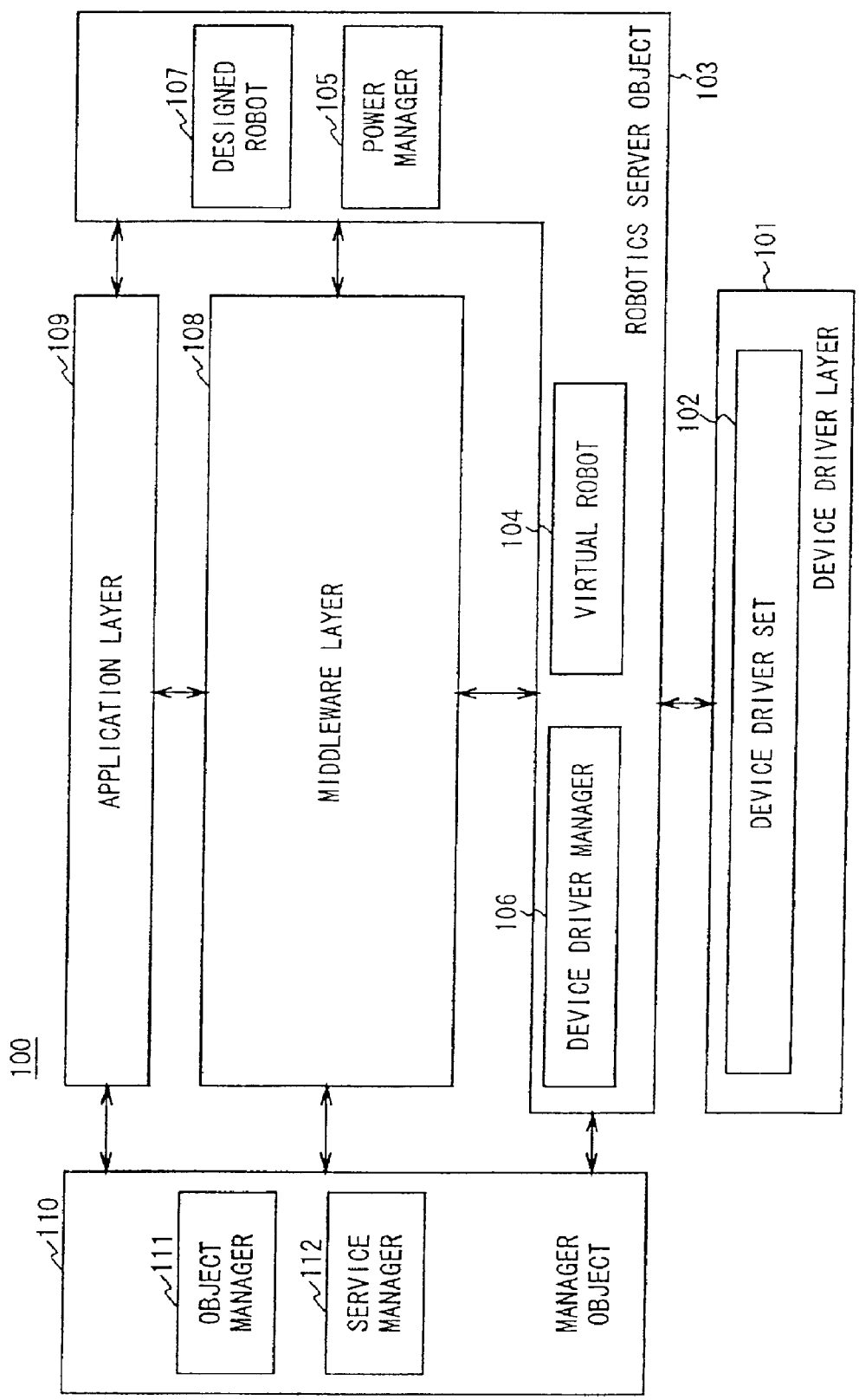
FIG. 6 is a diagram schematically illustrating the structure of software.

Here, the configuration of software of a control program 100 for controlling the operation of the pet robot 1 will be described below in reference to FIG. 6. A device driver layer 101 is located at a lowermost layer of the control program, and includes a device driver set 102 composed of a software group for achieving an interface to hardware such as a device driver for the FBK/CDT.

A robotics server object 103 is located over the device driver layer 101, and is configured by a virtual robot 104 composed of a software group for providing an interface for making access to the hardware of the pet robot 1, a power manager 105 composed of a software group for managing switching of a power source, a device driver manager 106 composed of a software group for managing other various device drivers, and a designed robot 107 composed of a software group for managing the mechanism of the pet robot 1.

A middleware layer 108 is located over the robotics server object 103, and is composed of a software group for performing image processing or voice processing. An application layer 109 is composed of a software group for determining an action of the pet robot 1 based on the processing result obtained by the software group composing the middleware layer 108.

A manager object 110 is configured by an object manager 111 and a service manager 112. The object manager 111 is composed of a software group for managing starting or ending of the software groups composing the robotics server object 103, the middleware layer 108 and the application layer 109. The service manager 112 is composed of a software group for managing connection of the objects based on connection information between the objects written in a connection file stored in the memory card 22.

(5) Image Processing Method

Now, by the use of flowcharts of FIGS. 7 and 8, explanation will be made below on the case where plural image processing such as color detection, motion detection and obstacle detection are simultaneously performed in parallel. First, in step SP2 following step SP1, the CPU 20 starts the FBK/CDT driver 102A so as to initialize the FBK/CDT 46.

Subsequently, in step SP3, the CPU 20 starts the robotic server object 103 so as to start the virtual robot 104. The virtual robot 104 produces, on the DRAM 24, plural common memories 120 for storing the image data therein, and then, sets information on an attribute of an image such as an image size in the FBK/CDT driver 102A. Moreover, upon completion of the start of the robotic server object 103, the CPU 20 subsequently starts the image processing objects constituting the middleware layer 108. Incidentally, the storage capacity of the produced shared memory 120 can be easily changed in accordance with the instruction of the virtual robot 104.

In step SP4, the virtual robot 104 informs the FBK/CDT driver 102A of an address of a desired shared memory 120 out of the plural common memories 120 produced on the DRAM 24, and further, issues, to the FBK/CDT driver 102A, a read request for requesting the transfer of the image data to the shared memory 120 at the informed address.

In step SP5, the FBK/CDT driver 102A constitutes data transfer means together with the virtual robot 104 and the DMA controller 48, produces the DMA list 121 for transferring the image data to a designated shared memory 120 upon receipt of the read request, and then, stores the DMA list 121 in the DRAM 24. At this moment, the FBK/CDT driver 102A informs the DMA controller 48 of the address of the DMA list 121 stored in the DRAM 24, and thereafter, allows the image data to be output to the FBK/CDT 46.

In step SP6, when the image data of one field is transferred to the designated shared memory 120, the FBK/CDT 46 generates interruption with respect to the FBK/CDT driver 102A so as to start software called an interruption handler. Subsequently, in step SP7, the interruption handler informs the virtual robot 104 of completion of the transfer of the image data.

In step SP8, the virtual robot 104 searches for the shared memory region where the reference times measuring counter is 0, and in step SP9, delivers it as the address of the shared memory 120 to be transferred to the FBK/CDT driver 102A so as to issue the read request. Thereafter, the routine returns to step SP5, and the above-described operation is repeated.

Figure 7:
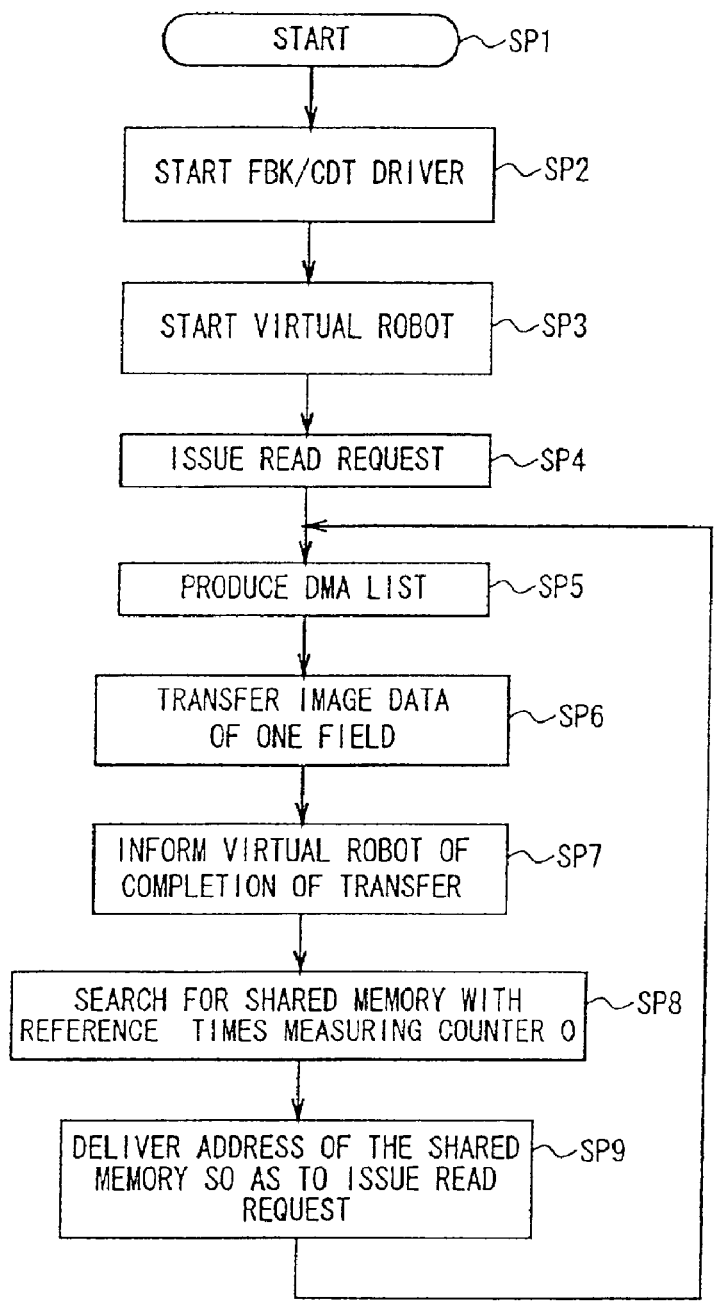
FIG. 7 is a flowchart illustrating an image processing method by the pet robot.
Figure 8:
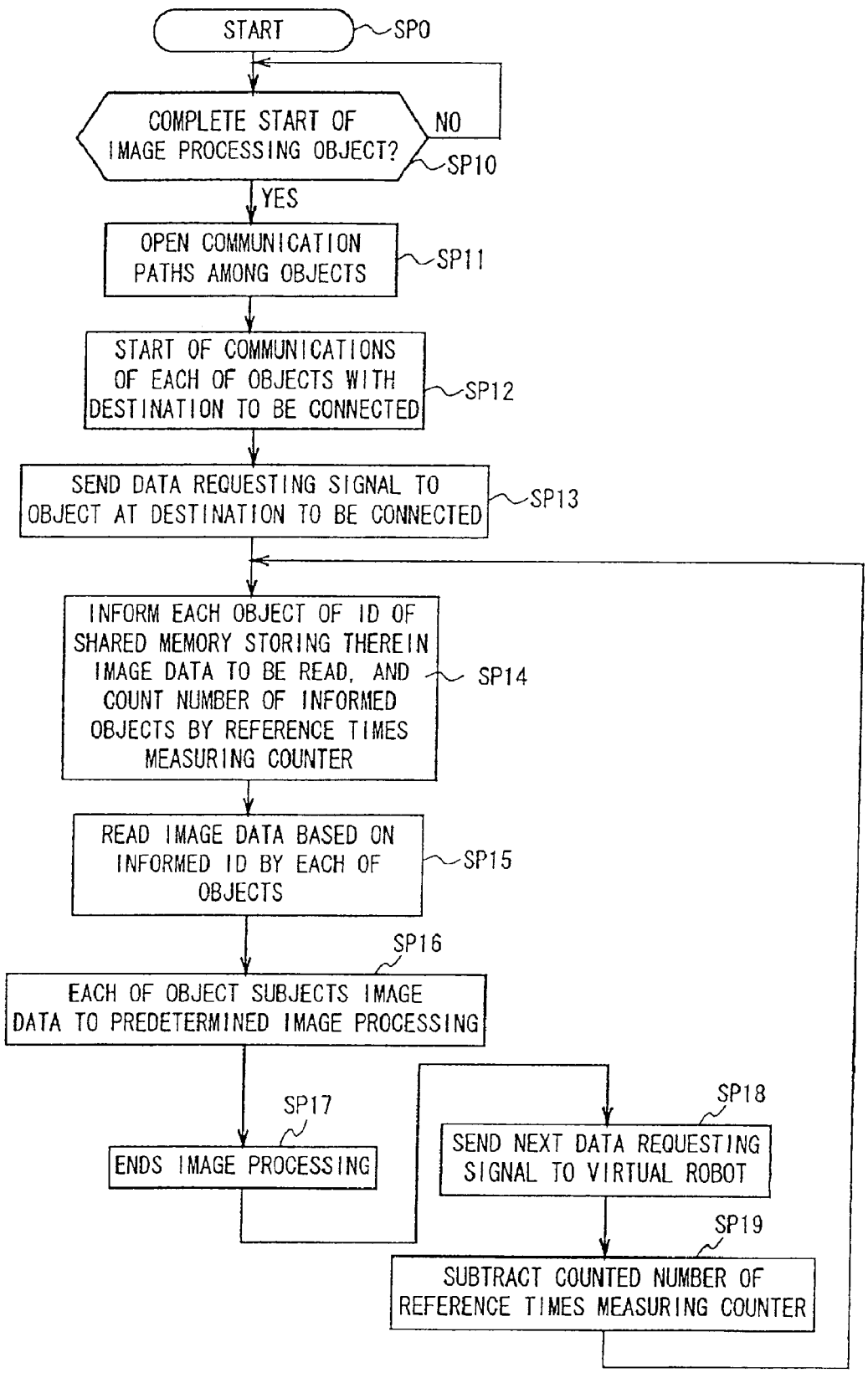
FIG. 8 is a flowchart illustrating the image processing method by the pet robot.
Figure 9:
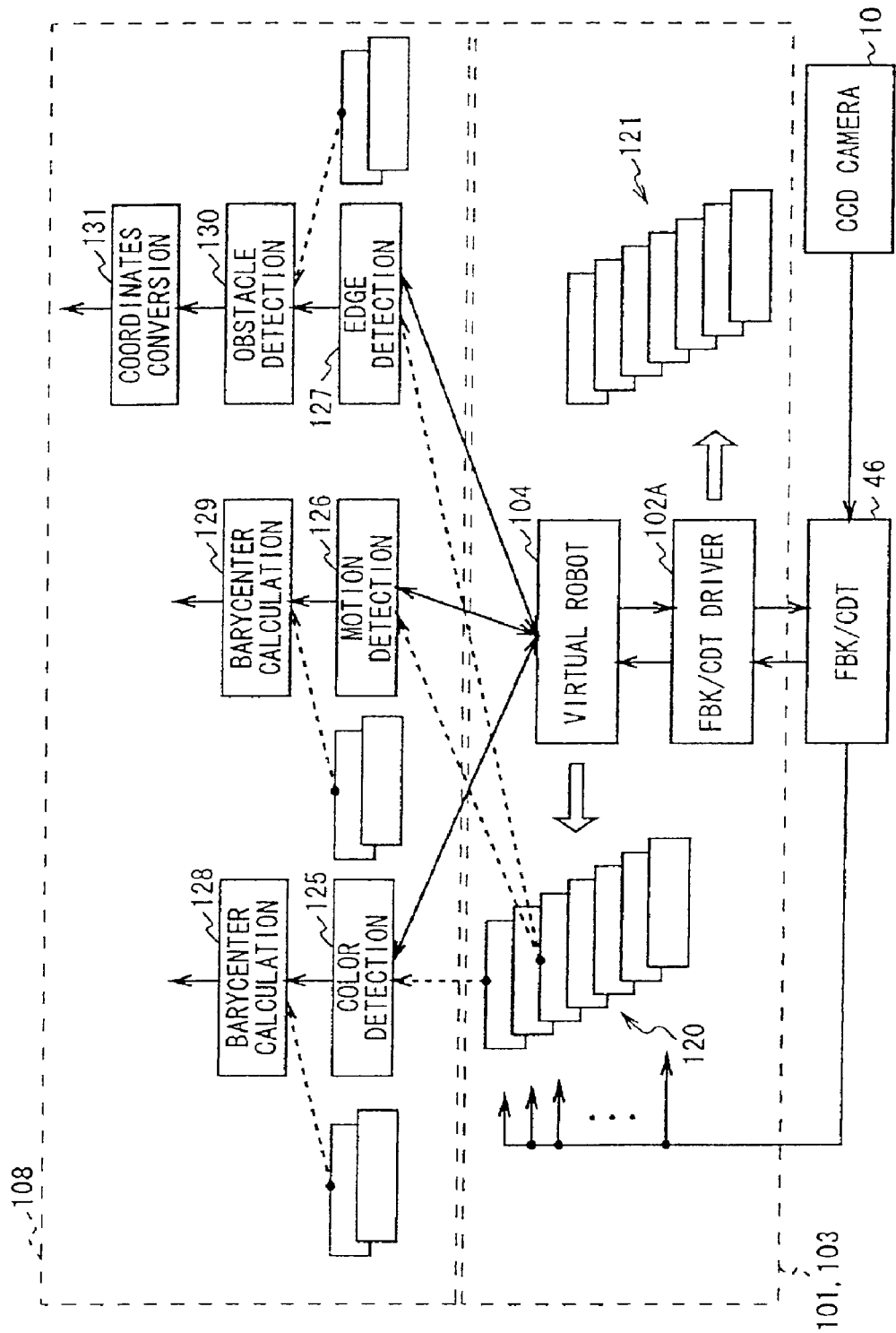
FIG. 9 is a diagram schematically illustrating the configuration of an image processing object.

On the other hand, the CPU 20 performs processing in accordance with the flowchart shown in FIG. 8 along with processing in FIG. 7. After starting this flowchart at step SP0, the CPU 20 judges whether or not the start of the image processing objects constituting the middleware layer 108 has been completed in the following step SP9. If it is judged that the start of the image processing objects has been completed already, the routine proceeds to step SP11. To the contrary, if it is judged that the start of the image processing objects has not been completed yet, the routine waits until the start has been completed.

In step SP11, the service manager 112 of the manager object 110 informs each of image processing objects of an image processing object at a destination to be connected upon completion of the start of the image processing objects of the middleware layer 108, and then, opens communication paths among the image processing objects. In this case, the service manager 112 connects, to the virtual robot 104, an image processing object 125 for color detection, an image processing object 126 for motion detection and an image processing object 127 for edge detection. Moreover, the service manager 112 connects an image processing object 128 for barycenter calculation to the image processing object 125 for color detection, and connects another image processing object 129 for barycenter calculation to the image processing object 126 for motion detection. Furthermore, the service manager 112 hierarchically connects an image processing object 130 for obstacle detection and an image processing object 131 for coordinates conversion to the image processing object 127 for edge detection. Incidentally, the connections among these image processing objects can be changed. Various kinds of processing can be performed by changing the connection interrelationship among the image processing objects.

In step SP13, the service manager 112 sends a start signal to each of the image processing objects upon completion of the connection among the image processing objects. Upon receipt of this, each of the image processing objects sends a data requesting signal to the image processing object at the destination to be connected in the lower layer based on connection information written in a connection file.

The image processing object 125 for color detection, the image processing object 126 for motion detection and the image processing object 127 for edge detection are configured to read the image data sequentially supplied from the FBK/CDT 46 at field intervals different from each other. The virtual robot 104 grasps the image data to be read respectively by the image processing objects 125 to 127 among the supplied image data.

Consequently, in step SP14, the virtual robot 104 actuates as informing means upon receipt of the data requesting signal from the image processing objects 125 to 127, so as to inform each of the image processing objects 125 to 127 of an ID (Identification, i.e., address information) assigned to the shared memory 120 storing therein the image data to be read by each of the image processing objects 125 to 127. At this time, the virtual robot 104 counts the number of informed image processing objects 125 to 127 with respect to each of the IDs, of which the image processing objects 125 to 127 are informed, by the use of a reference times measuring counter contained in the virtual robot 104, and then, stores the counted number therein.

At this moment, the virtual robot 104 actuates as transfer control means. Therefore, the virtual robot 104 writes the image data over the shared memory 120 in which the counted number is 0 so as to store the image data in sequence without writing the image data supplied from the FBK/CDT 46 over the shared memory 120 of the ID in which the number counted by the reference times measuring counter is not 0, thereby avoiding erroneous deletion of the image data which may be read by each of the image processing objects 125 to 127.

In step SP15, each of the image processing objects 125 to 127 reads the image data from the shared memory to which the informed ID is assigned. At this time, each of the image processing objects 125 and 126 may read the image data stored in one and the same shared memory 120. However, since the shared memory 120 is a read only memory, each of the image processing objects 125 to 127 can read the image data without any mutual interference.

In this way, each of the image processing objects 125 to 127 reads the image data from the desired shared memory 120, and thereafter, subjects the read image data to predetermined image processing so as to send the processing result to each of the objects 128 to 130 at the upper layer in step SP16, and ends the image processing to the data requesting signal in step SP17.

In the following step SP18, each of the image processing objects 125 to 127 sends a data requesting signal for requesting next image data to the virtual robot 104 based on the connection information written in the connection file. In step SP19, upon receipt of the data requesting signal, the virtual robot 104 subtracts the counted number of the reference times measuring counter stored in a manner corresponding to the ID, of which any of the image processing objects 125 to 127 sending the data requesting signal is informed, every time the data requesting signal is supplied. When the counted number becomes 0, the virtual robot 104 releases the protection of the image data stored in the shared memory 120 to which the ID having the counted number of 0 is assigned. Thus, the routine returns to step SP14, and then, the operation is repeated.

Namely, the image processing object 125 for color detection detects a color from the read image data, and then, sends the processing result to the image processing object 128 for barycenter calculation so as to calculate the position of the detected color. Furthermore, the image processing object 126 for motion detection detects a motion region from the image data, and then, sends the processing result to the image processing object 129 for barycenter calculation so as to calculate the position or size of the detected motion region. Moreover, the image processing object 127 for edge detection detects an edge from the image data, and then, sends the processing result to the image processing object 130 for obstacle detection so as to calculate the position of the obstacle. Thereafter, the image processing object 131 for coordinates conversion converts the coordinates of the position of the obstacle. Subsequently, the routine returns to step SP18, and the next processing follows.

In this way, since each of the image processing objects 125 to 127 reads the image data from the shared memory 120 produced on the DRAM 24, it is possible to achieve the general-purpose image processing objects independent of the CCD camera 10, thus combining the plural general-purpose image processing objects so as to facilitate various kinds of image processing.

(6) Operations and Effects

With the above-described configuration, the virtual robot 104 sequentially designates rewritable common memories 120 out of the plural common memories 120 produced on the DRAM 24, and sends the addresses of the designated common memories 120 to the FBK/CDT driver 102A.

The FBK/CDT driver 102A sequentially produces the DMA lists based on the addresses of the designated common memories 120, and stores them in the DRAM 24. The DMA controller 48 sequentially transfers the image data from the FBK/CDT 46 to the designated common memories 120 based on the DMA lists developed in the DRAM 24. In this manner, the image data obtained from the CCD camera 10 is transferred onto the DRAM 24, to which each of the image processing objects 125 to 127 can directly make access, thereby shortening a time required for the transfer of the image data and enhancing the safety of memory management.

The virtual robot 104 manages the image data to be read by each of the image processing objects 125 to 127 out of the image data stored in the common memories 120. Thus, the virtual robot 104 informs each of the image processing objects 125 to 127 of the address of the shared memory 120 storing therein the image data to be read upon receipt of the data requesting signal sent from each of the image processing objects 125 to 127.

Each of the image processing objects 125 to 127 reads the image data from the shared memory 120 based on the informed address, and subjects the read image data to predetermined image processing.

At this time, the virtual robot 104 stores the image processing objects 125 to 127, which are informed of the address of the shared memory 120, in the shared memory 120 storing therein the image data to be read, and then, prohibits the image data from being transferred from the FBK/CDT 46 to the shared memory 120 until next data requesting signals are supplied from all of the stored image processing objects 125 to 127.

Consequently, it is possible to securely protect the image data to be read while the plural independent image processing objects 125 to 127 are executed in parallel without any mutual interference.

With the above-described configuration, when the image data to be read is requested by each of the image processing objects 125 to 127, each of the image processing objects 125 to 127 is informed of the ID of the shared memory 120 storing therein the image data to be read, so that each of the image processing objects 125 to 127 can directly read the image data stored on the DRAM 24 based on the informed ID. Thus, it is possible to perform the plural independent image processing in parallel at a high speed with the simple configuration.

(7) Other Preferred Embodiments

Although in the above-described embodiment the description has been given of the case where the present invention is applied to the pet robot 1, it is understood that the present invention is not limited to such a case, but can be widely applied to other various kinds of robot apparatuses, e.g., a robot for use in the field of entertainment of games or exhibitions, an industrial robot such as a transporting robot or a construction robot, and the like.

Furthermore, although in the above-described embodiment the description has been given of the case where the present invention is applied to the pet robot 1, it is understood that the present invention is not limited to such a case, but can be widely applied to, e.g., other various kinds of image processing apparatuses capable of performing plural image processing in parallel such as a computer capable of performing plural image processing.

INDUSTRIAL APPLICABILITY

The present invention can be applied to a pet robot.

The present invention can also be applied to an image processing apparatus which executes plural processing in parallel at the same time.

What is claimed is:

1. An image processing apparatus including plural image processing means, by which plural kinds of image processing are executed in parallel, comprising:

data transfer means, each of which produces address information for use in storing, in storage means, plural image data sequentially input from image input means, and sequentially transfers and stores the image data to and in the storage means based on the produced address information; and informing means which informs each of the plural image processing means of the address information of the storage means in which image data to be read is stored upon request of the image data to be read by each of the plural image processing means, wherein said image processing means reads each of the image data to be read based on the informed address information so as to process the image data.

2. The image processing apparatus as set forth in claim 1, characterized by further comprising, transfer controlling means which sequentially transfers and stores the image data input from the image input means to and in a storage region other than a storage region storing therein the image data to be read out of storage regions forming the storage means until the image data to be read is read by the image processing means.

3. A robot apparatus including plural image processing means, by which plural kinds of image processing are executed in parallel, comprising:

data transfer means, each of which produces address information for use in storing, in storage means, plural image data sequentially input from image input means, and sequentially transfers and stores the image data to and in the storage means based on the produced address information; and informing means which informs each of the plural image processing means of the address information of the storage means in which image data to be read is stored upon request of the image data to be read by each of the plural image processing means, wherein said image processing means reads each of the image data to be read based on the informed address information so as to process the image data.

4. The robot apparatus as set forth in claim 3, characterized by further comprising transfer controlling means which sequentially transfers and stores the image data input from the image input means to and in a storage region other than a storage region storing therein the image data to be read out of storage regions forming the storage means until the image data to be read is read by the image processing means.

5. An image processing method in which plural image processing means execute plural kinds of image processing in parallel, comprising the steps of:

producing address information for use in storing, in storage means, plural image data sequentially input from image input means, so as to sequentially transfer and store the image data to and in the storage means based on the produced address information; and informing each of the plural image processing means of the address information of the storage means in which image data to be read is stored upon request of the image data to be read by each of the plural image processing means, wherein the stored image data is read based on the informed address information so as to process the image data.

6. The image processing method as set forth in claim 5, characterized by further comprising the step of sequentially transferring and storing the image data input from the image input means to and in a storage region other than a storage region storing therein the image data to be read out of storage regions forming the storage means until the image data to be read is read by the image processing means.

7. An image processing apparatus operated by object-oriented programming, comprising:

image input means;

plural image processing objects;

storage means accessible from said plural image processing objects;

data transfer means for producing address information used to store in said storage means a plurality of image data sequentially inputted from said image input means, and for sequentially transferring said plurality of mage data to said storage means based on the produced address information;

means responsive to a request from each said image processing object to read out image data from said storage means, to provide to the requesting image processing object the address at which the image data is stored, whereby said requesting image processing object reads out the image data, based on the provided address information so as to process the read out image data.

* * * * *